Figure 4:
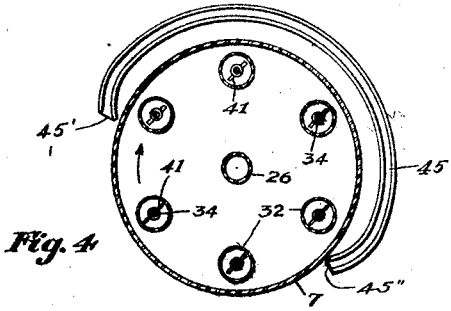

Nov. 10, 1925.

A. M. SMITH

COOKER

Filed Oct. 24, 1924

1,561,363

2 Sheets-Sheet 1

Inventor.
Alice Maud Smith

Patented Nov. 10, 1925.

1,561,363

UNITED STATES PATENT OFFICE.

ALICE MAUD SMITH, OF PORTLAND, MAINE.

COOKER.

Application filed October 24, 1924. Serial No. 745,707.

*To all whom it may concern:*

Be it known that I, ALICE MAUD SMITH, a citizen of the United States, residing at Portland, in the county of Cumberland and State of Maine, have invented new and useful Improvements in Cookers, of which the following is a specification.

My invention relates to the art of preparing and canning food products. It more especially concerns a method of cooking these products by transmitting heat to them in such a manner as not to impair or destroy the flavor of the original fruit or vegetable juices.

When intense heat is applied to vegetables or fruit in the process of cooking, chemical changes take place, which, while it may preserve the food, greatly changes the taste of same.

Likewise, when steam is used as the heating agent and is admitted directly into the mass of uncooked food it generally gives the later an unnatural flavor due in part to the condensed steam and often to offensive matter carried over from the steam generator, the former diluting the fruit juices and sirup.

One of the objects of my invention is to divide a considerable mass of the raw food into smaller units and subject these to a moderately high and even temperature, meanwhile agitating the food, which greatly lessens the cooking period.

Another object is to provide an automatically operated cooker which will not necessitate, in the matter of heat regulation, so constant attention as is usually the case in steam heated machines.

By interposing between the head sheets of a closed cylindrical vessel, resembling a boiler, a multiplicity of tubular members of comparatively small size and allowing the food to gravitate, from a quantity stored in a hopper superimposed on the top of the vessel, into these tubes, and with water raised to a high degree of temperature surrounding the latter, I am able to obtain a very uniformly heated product, enhanced by the agitation of the food, a matter previously referred to, which thoroughly mixes the food and gives the proper proportion of solid to liquid content when deposited in the shipping container.

I will call attention to the fact that my cooker requires no measuring devices for filling the cans or containers as the latter serve as their own measuring means. Being placed in vertical alignment with the food supply tubes, the cans are filled by gravity, and as considerable time is allotted for this operation the result is uniformly filled containers.

That portion of my cooker which has to do with the manipulation of the cans,—on and off the machine, is already the subject of a patent, namely,—Smith, #1,442,983, Jan. 23, 1923, and as I shall preferably adopt this device for my present invention, I have in a superficial way only illustrated the same in my drawings, which disclose the essential elements on which I base claim to novelty, depicting, however, by one embodiment of my invention; and I shall feel at liberty to depart from the exact and precise mechanical construction as herein set forth, provided that such changes as I might make shall not depart from the spirit and intent of the invention and fall within the scope of the appended claims.

Figure 5:
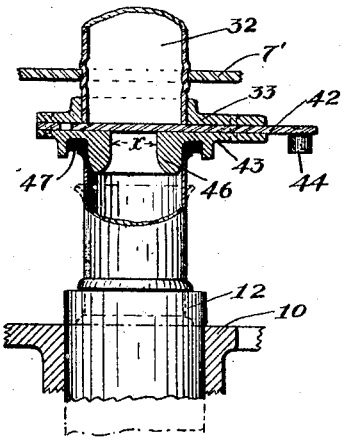
Figure 3:
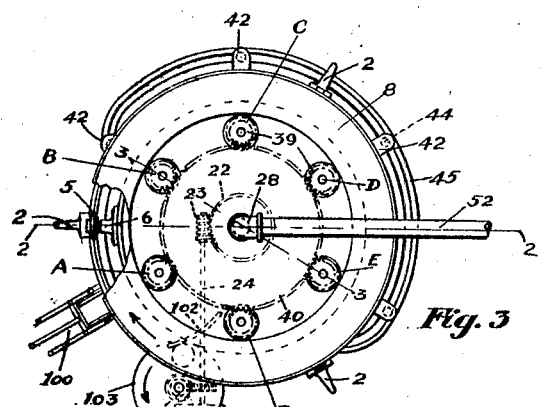
Figure 1:
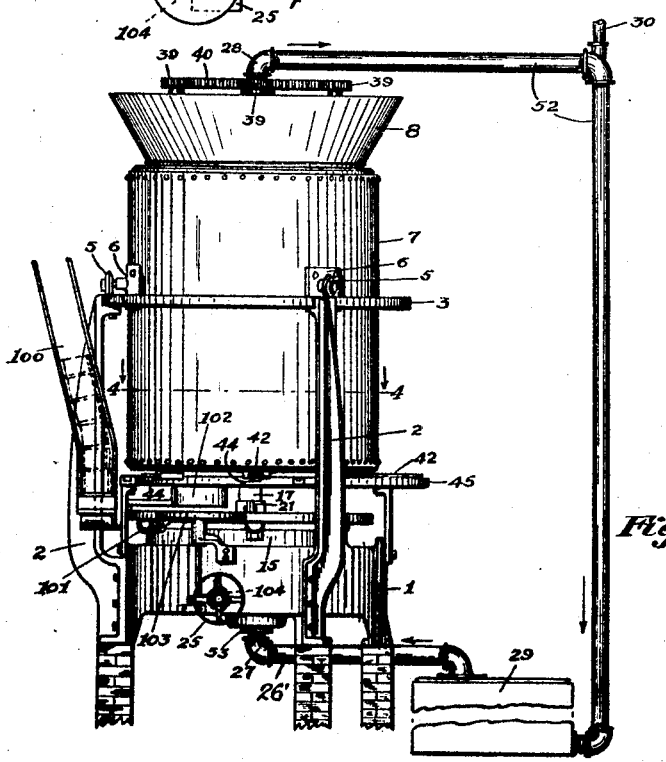
Figure 2:
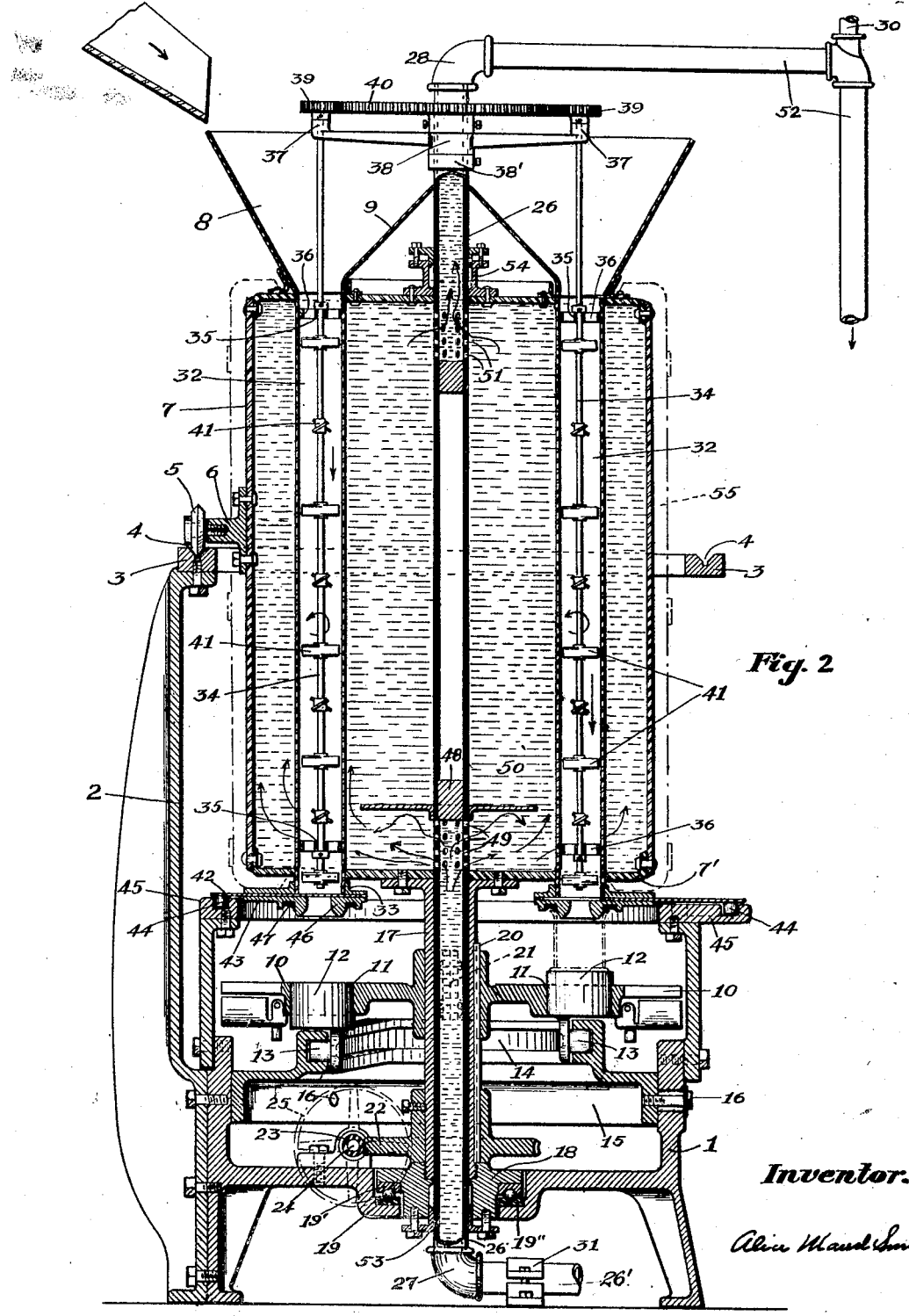

In the drawings accompanying and forming a part of this application, Fig. 1 is an elevation of the cooker; Fig. 2 is a sectional elevation of the same, the section through the base and column being taken on line 2—2, Fig. 3, and that through the hot water tank on line 3—3, Fig. 3; Fig. 3 is a plan view of the cooker; Fig. 4 is a sectional plan, taken on line 4—4, Fig. 1, and Fig. 5 is a detail, in section, of the food slide with a container thereunder.

Similar characters of reference refer to similar parts in all the different views of the drawings.

Referring to the several figures, 1 is a base member. Attached thereto and extending upwardly are columns 2. Secured to the upper ends of the columns is a ring 3 having a groove 4 made thereon.

Operating in this groove are V rolls 5 pivotally mounted on an extended portion of the bracket 6. These brackets (6) are secured to and partially support the hot-water tank 7, the latter centrally located above the base, and adapted to rotate within the said ring 3. Removably secured to the top of the tank 7 is a hopper 8, within and central of which is a cone shaped member 9.

At a convenient distance from the bottom of the base 1 is a rotatable can receiving table 10 through which at equally spaced intervals are bored holes 11. Reciprocating within these holes (11) are plungers 12 having rolls 13 pivotally mounted on the lower ends. These rolls operate in and their movements are controlled by a path cam 14 formed in the circular member 15 which is fixed by bolts 16 to the base 1.

Bolted to the lower head 7' of the hot water tank 7 is a flanged sleeve 17, and extending downwardly this member is fixedly secured to the housing 18,—the latter forming a part of the thrust bearing 19. 19' is a movable race for this bearing, it being secured to the latter by a press fit, and 19" is the stationary race pressed into a counterbored portion of the base 1.

The table 10 is fixed on the sleeve 17 by means of the key 20, and may be split, as at 21, to facilitate removal from the machine if necessary to do so, and also for the purpose of making vertical adjustments of the table on the sleeve.

Also fixed on the sleeve 17 is a worm gear 22 adaptable to engagement with the worm 23, the latter being mounted on the shaft 24 which may be actuated by any suitable prime mover through the agency of the pulley 25.

Extending from beneath the housing 18 upwardly through the hot water tank 7 and the conical member 9, is a tubular member 26, on the lower and upper ends of which are connections 27 and 28, respectively, and through which ingress and egress is made for hot water through portions of the tubular member 26. This hot water may be supplied by any convenient means,—as by a hot water boiler 29,—the hot water being taken from the top and the return made to the bottom of the boiler with suitable provision made for expansion through the vertical pipe 30.

The tubular member 26 remains at all times stationary and to prevent rotating with the hot water tank any suitable means,—as for instance, the strap 31 over the pipe 26', the strap being fixed to any stationary portion of the machine or the floor, may be provided.

Connecting both upper and lower heads of the hot water tank 7, and extending therethrough, are a multiplicity of open ended tubular members 32, the upper ends of which open into the hopper 8 and the lower ends terminate in the food slide housings 33. The ends of these tubular members adjacent the hot water tank heads may be rolled or beaded into the latter to make water tight joints.

Centrally located within each of the members 32 are vertical shafts 34 operating in bearings 35 within the perforate discs 36; these shafts also have bearings 37 on the multiple armed member 38 this latter member being held in vertical position by the collar 38'. On the extreme upper ends of the shafts 34 are fixed pinions 39 adapted to engage the gear 40 which is stationary, being fixed on the tubular member 26.

Positioned at intervals on the shaft 34, within the tubes 32, are paddles 41 with blades so set as to give an upward movement to the food as it descends against their faces and tending to retard the progress of the material in its downward passage through the tubes.

In Fig. 5 I show the construction of the food slide of my cooker. Mounted on the extreme lower end of the tube 32 is the slide housing 33 having a shallow groove on its under face somewhat wider than the diameter of the tube 32. A slide 42, of a thickness to closely fill the depth of the groove, operates therein, and when in closed or shut-off position extends somewhat beyond the opposite side of the tube 32. A cover 43 is secured to the housing 33, thereby providing a rectangular slot through which the slide may reciprocate backwardly and forwardly to open and close, respectively, the passage through the lower ends of the tubes 32. A roll 44 is pivotally mounted on the outer end of the slide, and is at certain times in engagement with a path cam cut in the incomplete ring member 45 (see Figs. 1, 2 and 3). It will be observed that this path is cammed at the beginning and ending of the member 45,—the remainder of the path is concentric, and while the roll 44 is in this concentric portion of the path the slide remains open. At a position marked 45' (Fig. 4) the slide starts to open; at 45" it is closed. Between these two positions the ring is broken away, although it is obvious that a complete ring may be provided having a concentric path, the arc of which is of smaller radius than the other concentric path, and in which the roll 44 would operate to hold the slide closed.

On the cover 43 is a downwardly disposed projection 46 which has two functions to perform. Firstly,—by slightly bevelling its lower edge it serves as a guide to facilitate the locating of the can into filling position; secondly,—it prevents overflowing of the food when the can is withdrawn from filling position. By observing Fig. 5 it will be seen that when the slide opens the material from the tube 32 will fill the can and also the chamber marked "x". On closing the slide and lowering the can into the "take-off" position, (shown in dot and dash lines) an overflowing of the can would take place were it not for the extended portion of the projection 46 within the can body. By making this extended portion and the chamber "x" of equal displacement the can will be filled, with no spilling of the goods, when separated from the filling station.

In a depressed portion surrounding the projection 46 I insert a ring 47 made of any suitable resilient substance, upon which the upper edge of the can abuts and against which the plunger 12 seats the can tightly.

As before mentioned, the path cam ring 45, actuating the rolls 44, opens, holds open and closes the food slides in their proper sequence. In Fig. 3 I have shown six stations or filling assemblies, but it is obvious, however, that a greater or less number might be employed. As shown, the can enters the machine at station A. At or near station B the food slide opens and remains open until a point is reached between stations E and F, when it closes. During this interval the cans are being gradually filled and the considerable time allotted for this operation is sufficient for the entering food to displace all the air in the container. After the can is lowered from the filling station parts, and before it is taken off its position on the plug 12 and swept off the table, it remains for a short period in vertical alignment with the tubes 32. This is for the purpose of allowing all drippings from the slide parts to enter the can and not be distributed over the feed table.

The mechanism for feeding the cans to the table, locating them thereon and taking them off is incompletely illustrated for reasons given in my preamble. Only so much is shown as will connect the elements of my present invention with any possible can feeding device which I may elect to employ.

Briefly described, the cans are fed toward the filling table through the can chute 100, are then lifted into position on the table by the swinging member 101 and put into alignment with the plungers 12 and the filling stations by guides, not shown. After being filled the can is interrupted in its path on the filling table and taken off the latter by the guard member 102 onto the rotating take-off table 103, which by suitable gearing 104 is made to revolve in the correct speed ratio with the filling table. From thence it is swept off by means not shown onto carrier and transported elsewhere for other operations.

Reverting again to a consideration of the function of the tubular member 26. Hot water of the required temperature enters its lower end through the pipe 26' and the fitting 27, and rising, is diverted by the plug 48 through the perforations 49 into the body of water in the hot water tank 7. To divert this hot current of water toward the cooking tubes 32 I provide a baffle plate 50. As the water reaches the uppermost portion of the tank 7 it again enters the tube 26 through the perforations 51 and passes out through the pipe 52 to the heating boiler.

As the hot water tank 7, with its attached parts rotate, and the central tubular member 26 remains fixed, I provide means to ensure water tight, but yielding connections between the two members, in the two expansion joint fittings,—one, 53, at the lowermost end of the tube 26 and the other, 54, at the top of the upper head of the water tank. To conserve heat in the tank water I may cover the tank with any suitable insulating material 55.

It is often advantageous in a machine such as the one under consideration to provide means for adjusting the parts so that cans of different sizes may be handled. This implies, however, that but one size can may be run through the machine at each separate adjustment of the parts. By detaching the cover plates 43, others may be substituted to fit the desired size of can to be used. This applies to the diameter of the container. To adjust for different lengths I utilize the clamped hub of the table 10,—raising or lowering to suit the requirements. Likewise the path cam 14 on the fixture 15, may be raised or lowered.

In operation, the heating water in the tank 7 having been brought to the required temperature, the hopper 8 and the tubes 32 are filled with the food product. Before starting to operate the filling portion of the machine a proper time must elapse in which to bring the food, just put into the tubes, to the proper temperature. This accomplished the machine is started and the cans allowed to feed on to the filling table and the filling operation begins. Subsequently, as the uncooked food from the hopper enters the tops of the heating tubes and gravitates to the food slide, in its downward course it becomes more thoroughly heated as it proceeds, so that on reaching the slide it is in condition to be unloaded into the shipping containers. It will thus be seen that a continuous outgoing of heated or cooked food takes place while the machine is being operated and so long as the hopper is supplied with the raw commodity.

I lay great stress on the fact that the food being cooked in the tubes is under a constant agitation. As stated in my preamble this stirring greatly lessens the time required to thoroughly heat the material, and by constructing the stirring agent as I have I make it serve another purpose, which is to more evenly mix and proportion the solid and liquid constituents of the food.

I also emphasize the theory, put into practice in my cooker, that a moderately high heat, such as would be within the range of the highest temperature to which water may be raised, with greater adaptability to control, is superior to an intense heat quickly applied to food; and in my cooker I have sought, and believe I have obtained results heretofore seldom if ever attained, namely,—a prepared food product retaining the natural and original flavor and characteristics of the food.

Having thus described my invention, what I claim is:

1. In a cooker, a cylindrical vessel with perforate heads thereon, tubes with open ends closely fitting said perforations and extending from head to head of said vessel, means for conducting water to said vessel, means for conducting water from said vessel, said water to at all times completely fill said vessel and to surround said tubes, means for rotating said vessel and means, surmounting said vessel, whereby a food storage space in direct communication with the open, upper ends of said tubes may be had.

2. In a cooker, a cylindrical vessel having a perforate head on each end thereof, and with the axis of said cylinder vertically disposed, means for rotating said vessel on its axis, a hopper surmounting said vessel, tubes, with open ends, extending through said vessel and through and closely fitting the said perforations in said heads and having their open ends in direct communication with the interior of said hopper, means for admitting water into said vessel, means for discharging water from said vessel, shafts rotatably and centrally mounted within said tubes and to extend therethrough, and means for rotating said shafts within said tubes.

3. In a cooker, a cylindrical vessel with perforate heads, the axis of said vessel being vertically disposed, tubes closely fitting said perforations in said heads and extending through said vessel from head to head thereof, means surmounting said vessel whereby a storage space for food may be had, said space to be in direct communication with the open ends of said tubes, shafts located within and on the axes of said tubes, paddles, at spaced intervals, on said shafts, with blades having inclined faces and their entering edges downwardly disposed, means by which water may be conducted into said vessel and around said tubes, means whereby said water may be conducted out of said vessel, means for rotating said vessel on its axis, means for rotating said shafts and valves beneath and in alignment with said tubes.

4. In a cooker, a cylindrical vessel having perforate heads, means for rotating said vessel with its axis vertically disposed, tubes fixed in said perforations and extending throughout said vessel and through said heads, shafts extending through said tubes and rotatably mounted within and central of same, paddles at spaced distances on said shafts within said tubes, a tubular member, fixed as against rotation, with its axis coincident with the axis of said vessel and extending through same and through the heads thereof, said member having perforations for the purpose of admitting water to the interior of said vessel and other perforations to discharge said water therefrom, means within said tubular member to divert the water, entering therethrough, into said vessel, said means consisting of a closure inserted within said member between the two said perforated portions, valves on the lower extremities of said tubes, means for opening said valves, means for closing said valves and means co-working between said vessel and said tubular member to prevent leakage of water from said vessel.

5. In a cooker, consisting of a cylindrical vessel having perforate heads, means for rotating said vessel with its axis vertically disposed, means for admitting a liquid body into, and discharging the same out of said vessel, tubes extending vertically through said vessel and through perforations in the heads thereof, a hopper, constituting a storage space for food, superimposed on said vessel, said hopper opening directly into the upper open ends of said tubes, valves on the lower open ends of said tubes, means for closing said valves, means, adjacent to and beneath said valves for locating and seating the open end of a food container, said locating means having a portion thereof depending and extending a spaced distance into the said food container, and provided with an aperture, at times in direct communication with the interior of said tubes and having a cubical content, above the top of the container, equal to the displacement of said depending portion below the top of said container, and means for opening the said valves whereby passage for food may be had to the said food container.

6. In a cooker, the combination, with means for feeding empty containers to said cooker and means for taking filled containers therefrom, of a cylindrical vessel having perforate heads, means, co-acting with said feeding and discharging means, to rotate said vessel with its axis vertically disposed, tubes extending through said vessel and through the heads thereof, a hopper, superimposed on said vessel and adapted to provide storage space for food and to open into and be at all times in direct communication with the upper open ends of said tubes, means for admitting water into said vessel, means for discharging water from said vessel, means for agitating said food entering said tubes, valves on the lower open ends of said tubes, means for opening said valves and means for closing said valves.

ALICE MAUD SMITH.